(12) United States Patent
Tsuchida et al.

(10) Patent No.: US 7,614,708 B2
(45) Date of Patent: Nov. 10, 2009

(54) VEHICULAR BRAKE HYDRAULIC CONTROL DEVICE

(75) Inventors: Tetsuo Tsuchida, Tomi (JP); Motoyasu Nakamura, Tomi (JP)

(73) Assignee: Nissin Kogyo Co., Ltd., Nagano (JP)

( * ) Notice: Subject to any disclaimer, the term of this patent is extended or adjusted under 35 U.S.C. 154(b) by 280 days.

(21) Appl. No.: 11/694,340

(22) Filed: Mar. 30, 2007

(65) Prior Publication Data

US 2007/0228817 A1 Oct. 4, 2007

(30) Foreign Application Priority Data

Mar. 31, 2006 (JP) ............................. 2006-100966

(51) Int. Cl.
*B60T 13/00* (2006.01)
*B60T 11/00* (2006.01)
(52) U.S. Cl. .................. 303/9.62; 303/11; 303/116.2; 303/DIG. 11; 188/345
(58) Field of Classification Search .............. 303/9.61, 303/9.62, 9.64, 9.71, 6.01, 113.4, 115.5, 303/11, 116.2, 119.1, DIG. 10, DIG. 11; 188/345, 353, 361
See application file for complete search history.

(56) References Cited

U.S. PATENT DOCUMENTS

| | | | | |
|---|---|---|---|---|
| 5,219,211 A | * | 6/1993 | Tsuchida et al. | 303/9.64 |
| 5,372,408 A | * | 12/1994 | Tsuchida et al. | 303/9.64 |
| 5,620,237 A | * | 4/1997 | Iwashita et al. | 303/9.64 |
| 6,070,949 A | * | 6/2000 | Hariu et al. | 303/9.61 |
| 6,390,566 B1 | * | 5/2002 | Matsuno | 303/9.64 |
| 6,543,859 B2 | | 4/2003 | Sakamoto | 303/113.2 |
| 2007/0228818 A1 | * | 10/2007 | Tsuchida et al. | 303/115.1 |

FOREIGN PATENT DOCUMENTS

| JP | A-2000 6779 | 1/2000 |
|---|---|---|
| JP | A-2002 264787 | 9/2002 |
| JP | 3457190 | 8/2003 |

* cited by examiner

*Primary Examiner*—Melody M Burch
(74) *Attorney, Agent, or Firm*—Greenblum & Bernstein P.L.C.

(57) ABSTRACT

A vehicular brake hydraulic pressure control device includes accumulators that are connected to a first brake pedal and store brake fluid with a first master cylinder at atmosphere. A first brake system is operable to apply interlock control to a front wheel brake F of a second brake system. A switching unit switches a channel of brake fluid flowing to the first hydraulic pressure output channel of the first brake system, from the first master cylinder to the accumulators when a pump is in operation.

6 Claims, 1 Drawing Sheet

VEHICULAR BRAKE HYDRAULIC CONTROL DEVICE

BACKGROUND OF THE INVENTION

1. Field of the Invention

The present invention relates to a vehicular brake hydraulic pressure control device, particularly a device that is applicable to bar handle type vehicles, such as two-wheeled motor vehicles, three-wheeled motor vehicle, and all terrain vehicles (ATV).

2. Description of Related Art

Known in the related art, a vehicular brake hydraulic pressure control device controls braking forces for the front and rear wheels in interlock braking of a vehicle, such as a two-wheeled motor vehicle, by applying hydraulic pressure from a pump (e.g. see Japanese Patent Unexamined Publication JP-A-2000-6779).

Further, a vehicular brake hydraulic pressure control device having a stroke simulator that applies reacting force due to operation of an operation element to the operator is also known in the related art (e.g. see Japanese Patent Examined Publication JP-B-3457190).

A vehicular brake hydraulic pressure control device, which has a stroke simulator that is connected to the first hydraulic pressure output channel and applies reacting force corresponding to operational amount of the first operation element to the operation element, is also known in the related art (e.g. see Japanese Patent Unexamined Publication JP-A-2002-264787).

The vehicular brake hydraulic pressure control device disclosed in JP-A-2002-264787 has an electric hydraulic brake pressure control mode and a mechanical hydraulic brake pressure control mode. As for an electric hydraulic brake pressure control mode, reacting force corresponding to operational force by an operation element is applied to the operation element by actuating a stroke simulator. Further, when problems appear in the electric hydraulic brake pressure control mode, fail safe function is accomplished by switching the electric hydraulic brake pressure control mode into a mechanical hydraulic brake pressure control mode with the components relating to the electric hydraulic brake pressure control mode off and supplying hydraulic brake pressure corresponding to the operational amount in braking directly to wheel cylinders.

However, in the vehicular brake hydraulic pressure control device according to the related art, in ABS in operation or interlock braking, because pulsation due to a pump in operation is transmitted to an operation element through channels, it was difficult to achieve good operational sensitivity.

SUMMARY OF THE INVENTION

In view of the above, it is an object of the invention to provide a vehicular brake hydraulic pressure control device with good operational sensitivity, without pulsation by a pump transmitted to an operation element.

According to a first aspect of the invention, there is provided a vehicular brake hydraulic pressure control device comprising:

first and second brake operation elements;
a first brake system comprising:
a first control valve unit that actuates a first wheel brake; and
an interlocking control valve unit that actuates a second wheel brake,
wherein the first control valve unit and the interlocking control valve unit are operated in response to operation of the first operation element;
a second brake system comprising a second control valve unit that actuates a second wheel brake in response to an operation of the second operation element; and
a switching unit;
wherein the first brake system comprise:
a first master cylinder that is connected to the first operation element and generates hydraulic brake pressure in a first hydraulic pressure output channel communicating with the first control valve unit and the interlocking control valve unit;
an accumulator that stores brake fluid, which is supplied to the first hydraulic pressure output channel, at atmosphere;
a cut valve that is disposed between the first hydraulic pressure output channel, and a first wheel hydraulic pressure channel connected to the first wheel brake and a interlocking wheel hydraulic pressure channel connected to the second wheel brake, and switches between allow-state and block-brake, in which brake fluid is allowed or not to flow from the first hydraulic pressure output channel to the first wheel hydraulic pressure channel and the interlocking wheel hydraulic pressure channel; and
a pump that is disposed between a hydraulic pressure intake channel connected to the first hydraulic pressure output channel and a hydraulic pressure discharge channel connected to the first wheel hydraulic pressure channel and the interlocking wheel hydraulic pressure channel, and
the second brake system comprises:
a second master cylinder that is connected to the second operation element and generates hydraulic brake pressure in a second hydraulic pressure output channel connected to the second control valve unit,
a plurality of brake cylinders that is provided in the second wheel brake, and comprising:
a first port into which brake fluid flows from the interlocking control valve unit of the first brake system and second ports into which brake fluid flowed from the second control valve unit enter thereto through other corresponding channels than the interlocking control valve unit, and
wherein the brake cylinder is actuated independently by corresponding brake fluid flowed from the respective control valve units, and
wherein the switching unit changes a channel through which the brake fluid flows into the first hydraulic pressure output channel, from the first master cylinder to the accumulators, when the pump is in operation.

According to the vehicular brake hydraulic pressure control device having the above configuration, since the channel of brake fluid flowing into the first hydraulic pressure output channel is changed from the first master cylinder to the accumulators by the switching unit, when the pump is in operation, the first master cylinder and the first hydraulic pressure output channel are divided such that brake fluid cannot flow therebetween. Accordingly, even though the pump of the first bake system in operation generates pulsation, the pulsation is not transmitted from the first brake system to the first operation element.

Further, the second wheel brake of the second brake system has a plurality of cylinders that has a first port into which brake fluid flows from the interlocking control valve unit of the first brake system and second ports into which brake fluid out of the second control valve unit flows through other corresponding channels than the interlocking control valve unit, and is actuated independently by corresponding brake fluid flowing from the control valve units. Accordingly, the ports corresponding to each channel are independent. Therefore, pulsation by the pump is not transmitted therebetween and good operational sensitivity for the second operation element is not deteriorated.

Further, since the accumulators store brake fluid to supply to the first hydraulic pressure output channel at atmosphere, brake fluid is supplied from the accumulators to the first hydraulic pressure output channel as needed, when the first master cylinder and the first hydraulic pressure output channel are divided by the switching unit such that brake fluid cannot flow therebetween. Further, in anti-lock braking control, brake fluid that has returned from the first wheel brake returns to the accumulators, so the brake fluid flows smooth into or out of the first hydraulic pressure output channel. Therefore, it is unnecessary to provide a reservoir or an intake valve to the first brake system and the number of parts is reduced with decrease in size of the device. Further, as the number of part is reduced manufacturing cost is saved.

According to a second aspect of the invention, it is preferable that the device as set forth in the first aspect of the invention, further comprising:

a detecting unit that detects the operational amount of the first operation element;

a stroke simulator that is connected to the first hydraulic pressure output channel, and applies reacting force to the first operation element in accordance with the detected operational amount by the detecting unit when the pump is in operation; and wherein the first control valve unit and the interlocking control valve unit are controlled on the basis of detected operational amount by the detecting unit.

According to the vehicular brake hydraulic pressure control device having the above configuration, when the pump is in operation, reacting force corresponding to operational amount of the operation element is transmitted to the operation element. The detecting unit detects operational amount of the first operation element, and the first control valve unit and the interlocking control valve unit of the first brake system are controlled according to the detected results by the detecting unit. Therefore, even thought the first master cylinder and the first hydraulic pressure output channel are divided such that brake fluid cannot flow therebetween, the operational amount of the first operation element can be used for hydraulic brake pressure controlled by the first brake system.

According to a third aspect of the invention, as set forth in the first aspect of the invention, it is preferable that the switching unit is a cutoff valve that opens and closes the first hydraulic pressure output channel and the accumulator is connected to the first hydraulic pressure output channel such that brake fluid flows into or out the accumulator.

According to the vehicular brake hydraulic pressure control device having the above configuration, the first hydraulic pressure output channel is opened/closed by the switching unit as a cutoff valve. Accordingly, pulsation is not transmitted from the first hydraulic pressure output channel to the first operation element by the cutoff valve closing, when the pump is in operation. Further, the accumulators are connected to the first hydraulic pressure output channel, so that brake fluid can flow between the accumulators and the first hydraulic pressure output channel, regardless the cutoff valve is open or closed. Accordingly, brake fluid is supplied smoothly from the accumulators to the first hydraulic pressure output channel and flows into the accumulators through the first hydraulic pressure output channel and stored. Further, pulsation by the pump is not transmitted to the operation element, so that stable hydraulic brake pressure can be achieved in the vehicular brake hydraulic pressure control device.

According to a fourth aspect of the invention, as set forth in the first aspect of the invention, it is preferable that the brake fluid returned to the first hydraulic pressure output channel through the hydraulic pressure intake channel flows into the accumulator.

According to the vehicular brake hydraulic pressure control device having the above configuration, even though brake fluid is returned often to the hydraulic pressure intake channel when pressure is decreased in anti-lock braking control, it can be sufficiently returned to the accumulators and also can decrease pressure smoothly. Accordingly, since pulsation by the pump is not transmitted to the operation element, stable hydraulic brake pressure can be achieved in the vehicular brake hydraulic pressure control device.

According to fifth and sixth aspects of the invention, as set forth in the first aspect of the invention, it is preferable that the first brake system is a rear wheel brake system and the second brake system is a front wheel brake system, or the first brake system is a front wheel brake system and the second brake system is a rear wheel brake system.

According to the vehicular brake hydraulic pressure control device having the above configuration, it may be possible to apply the configuration that the first master cylinder connected to the first operation element and the first hydraulic pressure output channel divided such that brake fluid cannot flow them, to the rear wheel brake and front wheel brake as well.

According to the invention, a vehicular brake hydraulic pressure control device with good operational sensitivity and without transmitting the pulsation of the pump to the operation element is achieved.

BRIEF DESCRIPTION OF THE DRAWINGS

The FIGURE shows a hydraulic brake pressure circuit view applied to a vehicular brake hydraulic pressure control device according to an embodiment of the invention.

DETAILED DESCRIPTION OF EXEMPLARY EMBODIMENTS OF THE INVENTION EMBODIMENTS

Figure 1:
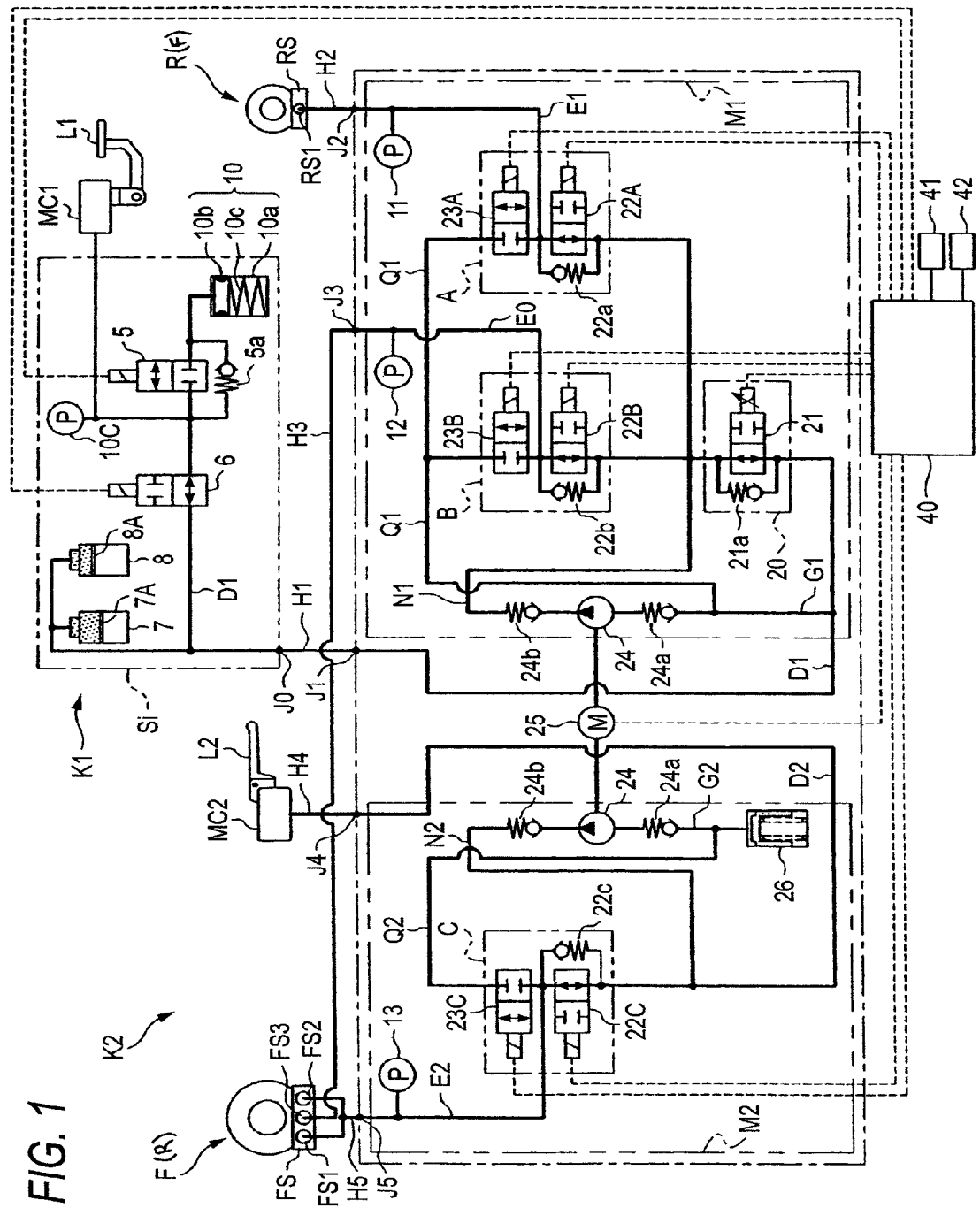

Preferred embodiments of the invention will be described hereafter with reference to accompanying drawings.

In the accompanying drawings, the FIGURE is a view showing a hydraulic brake pressure control circuit that is applied to a vehicular brake hydraulic pressure control device according to a first embodiment of the invention.

As shown in the FIGURE, a vehicular brake hydraulic pressure control device according to this embodiment is applicable to bar handle-typed vehicles, such as motorcycle, motor-tricycle and all terrain vehicles (ATV). The device includes first and second brake systems K1, K2, which are independent each other. According to the device, anti-lock braking that independently actuates wheel brakes F, R and interlock braking that interlockingly actuates two wheel brakes F, R are controlled by a controller 40 that controls braking force that are applied to the wheel brake F mounted at the front wheel and the wheel brake R mounted at the rear wheel. In the following description, the first brake system K1 is for the rear wheel and the second brake system K2 is for the front wheel.

The first brake system K1 includes a stroke simulator Si that is connected to a brake pedal L1 as a first operation element. Depending on the operational amount inputted in the stroke simulator Si from the brake pedal 1, the wheel brake R for the rear wheel is actuated and the wheel brake F for the front wheel is actuated with the rear wheel interlocked. In detail, braking operation (operational amount) inputted from the brake pedal L1 is electrically detected by a detecting unit (described later) of the stroke simulator Si. On the basis of the operational amount detected by the detecting unit, the controller 40 independently controls hydraulic brake pressure exerted in the rear wheel brake R and front wheel brake F by controlling the various equipments in the first brake system K1.

On the other hand, the second brake system K2 actuates mainly the front wheel brake F, depending on the operational amount of a second brake lever L2 as a second operation element. In detail, when braking operation is inputted from the brake lever L2, a second master cylinder MC2 is actuated and hydraulic brake pressure is directly transmitted to the second brake system K2 from the second master cylinder MC2 accordingly.

According to the embodiment, the rear wheel brake R has a brake cylinder RS having one input port and one cylinder RS1, while the front wheel brake F has a brake cylinder FS having two input ports and three independent cylinders FS 1 to FS 3. Brake fluid from the first brake system K1 flows into one (first port) of the two input ports of the brake cylinder FS. Further, brake fluid from the second brake system K2 flows into the other input port (second port). According to the embodiment, brake fluid flows into the cylinder FS3 through the first port and into the two cylinders FS1 and FS2 through the second port.

A hydraulic circuit shown in FIG. 1 is described hereafter in detail.

The first brake system K1, provided to brake the rear wheel as described above, includes a brake pedal L1, a first master cylinder MC1 that generates hydraulic brake pressure corresponding to operational force applied to the brake pedal L1 by a driver, a stroke simulator S1 that is connected to the first master cylinder MC1 between the wheel brakes R, and a modulator M1 that is connected to the wheel brake R. Hydraulic brake pressure can be applied to the wheel brake F through the modulator M1.

The stroke simulator S1 includes a dummy cylinder 10, an opening/closing valve 5, a chuck valve 5a, a cutoff valve 6 (a switching unit), accumulators 7, 8, and a pressure-detecting sensor 10C.

The modulator M1 mainly includes a regulator 20, a first control valve unit A, an interlock control valve unit B (including inlet valves 22A, 22B and outlet valves 23A, 23B), a first hydraulic pressure sensor 11, a second hydraulic pressure sensor 12, and a pump 24. Further, the modulator M1 includes channels connected from an inlet port J1 to an outlet port J2 and from the inlet port J1 to an outlet port J3, respectively. An outlet port J0 of the stroke simulator S1 is connected to the inlet port J1 of the modulator M1 through a pipe H1. The outlet port J2 is connected to the rear wheel brake R through a pipe H2 and the outlet port J3 is connected to the front wheel brake F through a pipe H3.

Hereinafter, a first hydraulic pressure output channel D1 refers to the channel from the first master cylinder MC1 to the regulator 20 of the modulator M1 through the cutoff valve 6 of the stroke simulator Si, a first wheel hydraulic pressure channel E1 refers to the channel from the regulator 20 to the wheel brake R, a interlocking wheel hydraulic pressure channel E0 refers to the channel from the regulator 20 to the wheel brake F, a hydraulic pressure intake channel G1 refers to the channel from the first hydraulic pressure output channel D1 to the pump 24, a hydraulic pressure discharge channel N1 refers to the channel from the pump 24 to the first wheel hydraulic pressure channel E1 and interlocking wheel hydraulic pressure channel E0, and a release channel Q1 refers to the channel from the first wheel-hydraulic pressure channel E1 and interlock wheel hydraulic pressure channel E0 to the intake hydraulic pressure channel G1.

The first master cylinder MC1 has cylinder (not shown) connected to a brake fluid tank that stores brake fluid. A rod piston (not shown) that slides in the axial direction of the cylinder by operation of the brake pedal L1 and make the brake fluid flow into the first hydraulic pressure output channel D1 is provided inside the cylinder.

The dummy cylinder 10 of the stroke simulator Si has a cylinder body 10a, a piston 10b slidably disposed in the cylinder body 10a, and a spring 10c urging the piston 10b, and is connected to the first hydraulic pressure output channel D1 through the opening/closing valve 5. The dummy cylinder 10 having the above configuration allows the brake fluid, which has flowed into the first hydraulic pressure output channel D1 from the first master cylinder MC1 by operation of the brake pedal L1, to flow inside through an idle stroke of the piston 10b, with the cutoff valve 6 closed and the opening/closing valve 5 open. Further, the dummy cylinder 10 applies an operational reacting force caused by the operation of the brake pedal L1 to the brake pedal L1. Accordingly, the operational sensitivity is ensured for the brake pedal L1 and hydraulic brake pressure is detected by the pressure-detecting sensor 10C. The detected values from the pressure-detecting sensor 10C are continually transmitted to the controller 40 and used to control hydraulic brake pressure in the first brake system K1.

The opening/closing valve 5 is a normally close type electromagnetic valve, and in a normal state, the opening/closing valve 5 communicates the first hydraulic pressure output channel D1 with the dummy cylinder 10 when a driving unit of a vehicle (not shown, the same hereafter), such as an engine, is in operation. Further, when a driving device, such as an engine, is in stop state, the opening/closing valve 5 blocks the first hydraulic pressure output channel D1 from the dummy cylinder 10. A check valve 5a is connected in parallel with the opening/closing valve 5. The check valve 5a allows brake fluid to flow only from the dummy cylinder 10 into the first hydraulic pressure output channel D1. When the brake pedal L1 is released from an input position, the check valve 5a allows brake fluid to flow into the first hydraulic pressure output channel D1 from the dummy cylinder 10, even though the opening/closing valve 5 is closed.

The cutoff valve 6 opens and closes the first hydraulic pressure output valve D1 and switches to allow or block brake fluid flowing from the first master cylinder MC1 to the modulator M1, i.e. from the first master cylinder MC1 to the rear wheel brake R. The cutoff valve 6 has a normally close type electromagnetic valve disposed on the first hydraulic pressure output channel D1.

According to the embodiment, as a driving device such as an engine starts, the cutoff valve 6 simultaneously closes. Specifically, while a driving device, such as an engine, is in operation, the cutoff valve 6 closes the first hydraulic pressure output channel D1 and blocks brake fluid flowing from the first master cylinder MC1 to the modulator M1. When the driving device such as an engine is stopped or the controller 40 is stopped, the cutoff valve 6 is necessarily opened, and operational force from the brake pedal L1 (i.e. hydraulic brake pressure exerted in the first master cylinder MC1) is directly transmitted to the wheel brake R. Accordingly, it is possible to achieve fail safe function.

The accumulators 7,8 are connected to the first hydraulic pressure output channel D1 and store brake fluid, which has returned to the hydraulic pressure intake channel G1 through the release channel Q1, through the first hydraulic pressure output channel D1, when the pump 24 is stopped. The accumulators 7, 8 respectively has brake fluid chambers 7A, 8A to store brake fluid returning through the first hydraulic pressure output channel D1. According to the embodiment, the brake fluid chamber 8A of the accumulator 8 is larger in capacity than the brake fluid chamber 7A of the accumulator 7. In other words, inflow and outflow of brake fluid is larger at the accumulator 8 than the accumulator 7. The brake fluid chambers 7A, 8A of the accumulators 7, 8 may have the same capacity, or the number of them may be appropriately selected. Brake fluid stored in the accumulators 7, 8 flows out to the hydraulic pressure intake channel G1 through the first hydraulic pressure output channel D1 by the pump 24.

The regulator 20 in the modulator M1 switches to allow or block brake fluid flowing from the first hydraulic pressure output channel D1 to the first wheel hydraulic pressure channel E1 (interlocking wheel hydraulic pressure channel E0). Further, the regulator 20 regulates hydraulic brake pressure to be equal to or more a predetermined value at the first wheel hydraulic pressure channel E1 (interlocking wheel hydraulic pressure channel E0) and the hydraulic pressure discharge channel N1, when brake fluid is stopped from flowing from the first hydraulic pressure output channel D1 to the first wheel hydraulic pressure channel E1 (interlocking wheel hydraulic pressure channel E0) The regulator 20 has a cut valve 21 and a check valve 21a.

The cut valve 21 is a normally closed linear solenoid valve disposed between the first hydraulic pressure output channel D1 and the first wheel hydraulic pressure channel E1 and interlocking wheel hydraulic pressure channel E0. The cut valve 21 switches to allow and block brake fluid flowing from the first hydraulic pressure output channel D1 to the first wheel hydraulic pressure channel E1 and interlocking wheel hydraulic pressure channel E0. That is, the cut valve 21 is operable to regulate open-valve pressure by controlling current flowing into the solenoid. In the normal state, the cut valve 21 is opened so that it allows brake fluid, which is discharged out of the pump 24 to the hydraulic pressure discharge channel N1 and flows into the first wheel hydraulic pressure channel E1 and interlocking wheel hydraulic pressure channel E0, to return to the hydraulic pressure intake channel G1 (circulation). Further, when the brake pedal L1 is operated, that is, hydraulic brake pressure is applied to the wheel brake R, the cut valve 21 is closed by the controller 40 and regulates hydraulic brake pressure of the first wheel hydraulic pressure channel E1 and interlocking wheel hydraulic pressure channel E0 by releasing the brake pressure to the hydraulic pressure intake channel G1, by balancing the hydraulic brake pressure applied to the regulator 20 from the first hydraulic pressure output channel D1 and the force controlled by electric current flowing into the solenoid to close the valve.

The check valve 21a is connected in parallel with the cut valve 21. The chuck valve 21a is a one-way valve that allows brake fluid to flow from the first hydraulic pressure output channel D1 to the first wheel hydraulic pressure channel E1 and interlocking wheel hydraulic pressure channel E0.

The first control valve unit A has a function of switching the states of:

closing the release channel Q1 while releasing the first wheel hydraulic pressure channel E1, releasing the release channel Q1 while closing the first wheel hydraulic pressure channel E1, and closing both of the first wheel hydraulic pressure channel E1 and release channel Q1.

The first control valve unit A has the inlet valve 22A, a check valve 22a, and the outlet valve 23A.

The inlet valve 22A is a normally close type electromagnetic valve disposed on the first wheel hydraulic pressure channel E1. In a normal state, the inlet valve 22A is opened so that it allows hydraulic brake pressure to be transmitted from the pump 24 to the wheel brake R through the first wheel hydraulic pressure channel E1. Further, the inlet valve 22A is closed by the controller 40, when the rear wheel is falling into locking state, so that it blocks hydraulic brake pressure transmitted from the pump 24 to the wheel brake R through the first wheel hydraulic pressure channel E1.

The outlet valve 23A is a normally close type electromagnetic valve disposed between the first wheel hydraulic pressure channel E1 and the release channel Q1. The outlet valve 23A is normally closed. However, when the rear wheel is falling into locking state, the outlet valve 23A is opened by the controller 40 and hydraulic brake pressure exerted in the wheel brake R is released from the release channel Q1 to the hydraulic pressure intake channel G1. Therefore, the brake fluid released to the hydraulic pressure intake channel G1 returns to the accumulators 7, 8 through the first hydraulic pressure output channel D1. When the pump 24 is stopped (driving unit, such as an engine, in stop motion), the cutoff valve 6 is open. Accordingly, the brake fluid released to the hydraulic pressure intake channel G1 returns to the accumulators 7, 8 and the master cylinder MC1 through the first hydraulic pressure output channel D1.

The check valve 22a is connected in parallel with the inlet valve 22A. The check valve 22a allows brake fluid to flow only from the wheel brake R into the regulator 20. When input force applied to the brake pedal L1 is released, the check valve 22a allows brake fluid to flow from the wheel brake R into the regulator 20 even though the inlet valve 22A is open.

The interlock control valve unit B mainly controls brake fluid at the front wheel brake F, in response to operation of the brake pedal L1. The interlock control valve unit B has a function of switching the states of:

closing the release channel Q1 while releasing the interlocking wheel hydraulic pressure channel E0, releasing the release channel Q1 while closing the interlocking wheel hydraulic pressure channel E0, and closing the release channel Q1 while closing the interlocking wheel hydraulic pressure channel E0.

The interlock control valve unit B has the inlet valve 22B, the outlet valve 23B, and a check valve 22b.

The inlet valve 22B is a normally close type electromagnetic valve disposed on the interlocking wheel hydraulic pressure channel E0. In the normal state, the inlet valve 22B is opened and allows brake fluid discharged out of the pump 24 to flow to the wheel brake F through the interlocking wheel hydraulic pressure channel E0. Further, the inlet valve 22B is closed by the controller 40, when the front wheel is falling into locking state, so that it blocks hydraulic brake pressure transmitted from the pump 24 to the wheel brake F through the interlocking wheel hydraulic pressure channel E0.

The outlet valve 23B is a normally close type electromagnetic valve disposed between the interlocking wheel hydraulic pressure channel E0 and the release channel Q1. Although the outlet valve 23 is normally closed, however, when the front wheel is falling into locking state, the outlet valve 23B is opened by the controller 40 and hydraulic brake pressure exerted in the wheel brake F is released to the hydraulic pressure intake channel G1 through the release channel Q1. Accordingly, the brake fluid released to the hydraulic pressure intake channel G1 returns to the accumulators 7, 8 through the first hydraulic pressure output channel D1.

The check valve 22b is connected in parallel with the inlet valve 22B. The check valve 22b allows brake fluid to flow only from the wheel brake F into the regulator 20. When input force exerted in the brake pedal L1 is released, the check valve 22b allows brake fluid to flow from the wheel brake F into the regulator 20 even though the inlet valve 22B is closed.

The first hydraulic pressure sensor 11, disposed on the first wheel hydraulic pressure channel E1, measures magnitude of the hydraulic brake pressure exerted in the wheel brake R. The measured values of hydraulic brake pressure by the first hydraulic pressure sensor 11 are transmitted to the controller 40 as needed. In detail, the controller 40 controls the first control valve unit A and the interlocking control valve unit B such that the measured values at the first hydraulic pressure sensor 11 correspond to those at the pressure-detecting sensor 10C of the stroke simulator Si, by comparing the measured values of hydraulic brake pressure at the first hydraulic pressure sensor 11 with the measured value of hydraulic brake pressure at the pressure-detecting sensor 10C.

The second hydraulic pressure sensor 12, disposed on the interlocking wheel hydraulic pressure channel E0, measures magnitude of the hydraulic brake pressure exerted in the wheel brake F. The measured values of hydraulic brake pressure at the second hydraulic pressure sensor 12 are continually transmitted to the controller 40 and used to control interlock braking. Specifically, the controller 40 controls the interlocking control valve unit B such that the measured values at the second hydraulic pressure sensor 12 correspond to those at the pressure-detecting sensor 10C of the stroke simulator Si, by comparing the measured values of hydraulic brake pressure at the second hydraulic pressure sensor 12 with the measured value of hydraulic brake pressure at the pressure-detecting sensor 10C. The controller 40 has a map (not shown) containing ratio of braking force of the front and rear wheels in interlock braking, so that it obtains ratios of braking force of the front and rear wheels on the basis of various quantity of state representing running state of a vehicle and controls the first control valve unit A and the interlocking control valve unit B on the basis of the obtained ratios.

The pump 24 has an intake valve 24a and a discharge valve 24b at the intake and discharge sides, respectively, and is disposed between the hydraulic pressure intake channel G1 and the hydraulic pressure discharge channel N1. Actuated by rotational force from a motor 25, the pump 24 sucks brake fluid through the hydraulic pressure intake channel G1 and then discharges it to the hydraulic pressure discharge channel N1. When the cut valve 21 is closed, the pump 24 sucks brake fluid stored in the accumulators 7, 8 and discharges it to the hydraulic pressure discharge channel N1. Accordingly, as brake fluid returns to the accumulators 7, 8, the first wheel hydraulic pressure channel E1 (interlocking wheel hydraulic pressure channel E0) that has been decompressed returns to the normal state in pressure. Further, it is possible to increase the brake fluid in the wheel brake R in pressure through the brake pedal L1 or the brake fluid in the wheel brake F by the interlock braking.

The motor 25 is a common power source for the pumps 24 of the first brake system K1 and the second brake system K2, and is driven in response to commands from the controller 40.

The second brake system K2 is described below. The second brake system K2 controlling the front wheel as described above, includes a brake lever L2, a second master cylinder MC2 generating hydraulic brake pressure corresponding to operation force applied to the brake lever L2 by a driver, and a modulator M2 connected between the wheel brakes F.

The modulator M2 mainly includes a second control valve unit C (including an inlet valve 22C and an outlet valve 23C), a pump 24, a reservoir 26, and a third hydraulic pressure sensor 13. Further, the modulator M2 includes a channel from an inlet port J4 to an outlet port J5. A pipe H4 is connected between the second master cylinder MC2 and the inlet port J4.

Hereinafter, a second hydraulic pressure output channel D2 refers to the channel from the inlet port J4 to the second control unit C, a second wheel hydraulic pressure channel E2 refers to the channel from the second control valve unit C to the outlet port J5, an release channel Q2 refers to the second wheel hydraulic pressure channel E2 to the pump 24, a hydraulic pressure intake channel G2 refers to the channel from the release channel Q2 to the pump 24, and a hydraulic pressure discharge channel N2 refers to the channel from the pump 24 to the second wheel hydraulic pressure channel E2.

The second control valve unit C has a function of switching the states of:

closing the release channel Q2 while releasing the second wheel hydraulic pressure channel E2, releasing the release channel Q2 while closing the second wheel hydraulic pressure channel E2, and closing both of the second wheel hydraulic pressure channel E2 and the release channel Q2.

The second control unit C includes the inlet valve 22C, the check valve 22c, and the outlet valve 23C.

The inlet valve 22C is a normally close type electromagnetic valve disposed on the second wheel hydraulic pressure channel E2. In the normal state, the inlet valve 22C is opened so that it allows hydraulic brake pressure to be transmitted from the second master cylinder MC2 to the wheel brake F. Further, when the front wheel is falling into locking state, the inlet valve 22C is closed by the controller 40, so that it blocks hydraulic brake pressure transmitted from the second master cylinder MC2 to the wheel brake F.

The outlet valve 23C is a normally close type electromagnetic valve disposed between the second wheel hydraulic pressure channel E2 and the release channel Q2. Although the outlet valve 23C is normally opened, however, when the front wheel is falling into locking state, it is closed by the controller 40, so that it releases brake fluid in the front wheel brake F to the hydraulic pressure intake channel G2 through the release channel Q2. Brake fluid is released to the hydraulic pressure intake channel G2 and flows into the reservoir 26.

The check valve 22c is connected in parallel with the inlet valve 22C. The check valve 22c allows brake fluid to flow only from the wheel brake F to the second master cylinder MC2. The check valve 22c allows brake fluid to flow from the wheel brake F to the second master cylinder MC2, even though the inlet valve 22C is closed.

Actuated by a rotational force from the motor 25, the pump 24 in the second brake system K2 sucks brake fluid through the hydraulic pressure intake channel G2 (reservoir 26) and then discharges it to the hydraulic pressure discharge channel N2.

The reservoir 26 is disposed on the release channel Q2 and temporarily stores brake fluid released by the outlet valve 23C opening. Brake fluid stored in the reservoir 26 is sucked by the pump 24 to increase the wheel brake F in pressure.

The third hydraulic pressure sensor 13 is disposed on the second wheel hydraulic pressure channel E2 and measures magnitude of the hydraulic brake pressure exerted in the wheel brake F through the modulator M2. The values of hydraulic brake pressure measured at the third hydraulic pressure sensor 13 are continually transmitted to the controller 40.

The controller 40 receives the measured vales from the pressure-detecting sensor 10C, first hydraulic pressure sensor 11, second hydraulic pressure sensor 12, and third hydraulic pressure sensor 13 and controls various equipments in the first and second brake systems K1, K2 in response to outputs from a front wheel speed sensor 41 fixedly disposed and facing the side of a pulser gear fixed to the front wheel (not shown) and a rear wheel speed sensor 42 fixedly disposed and facing the side of a pulser gear fixed to the rear wheel (not shown).

Normal braking control (interlock braking control) and anti-lock braking control by the controller 40 is described hereafter.

(Normal Braking Control)

When the driving unit (not shown), such as an engine, is stopped, in the first brake system K1 for the rear wheel, first master cylinder MC1 is communicated with the wheel brakes R, F through the first hydraulic pressure output channel D1. Accordingly, as the brake pedal L1 is operated, hydraulic brake pressure is applied to the cylinder RS1 of the brake cylinder RS of the wheel brake R through the first hydraulic pressure output channel D1 and the first wheel hydraulic pressure channel E1. Further, at the same time, hydraulic brake pressure is applied to the cylinder FS3 of the brake cylinder FS of the wheel brake F from the first hydraulic pressure output channel D1 through the interlocking wheel hydraulic pressure channel E0. Therefore, when the driving unit, such as an engine, is stopped, braking control for the front and rear wheels is achieved by operating the brake pedal L1.

On the other hand, the driving unit, such as an engine, is in operation, in the first brake system K1 for the rear wheel, interlock braking control of the rear wheel, the main part, with the front wheel is performed in normal braking. In the interlock braking control, the brake force is applied mainly to the rear wheel.

When the driving unit starts by ignition, the cutoff valve 6 of the stroke simulator Si is closed with being communicated with the opening/closing valve 5, and the first master cylinder MC1 is connected to the dummy cylinder 10. Accordingly, the operational reacting force by the operation of the brake pedal L1 is applied to the brake pedal L1.

On the other hand, since the cutoff valve 6 is closed, the cutoff valve 6 divides the first master cylinder MC1 from the modulator M1 and brake fluid cannot flow therebetween.

Under the above-mentioned condition, when the brake pedal L1 is operated to control braking in the first brake system K1, the inlet valves 22A, 22B are closed.

When the brake pedal L1 is operated, the pressure-detecting sensor 10C of the stroke simulator Si detects the operational amount of the brake pedal L1 as a measured value of hydraulic brake pressure. A detecting signal for the measured value is inputted to the controller 40 and the pump 24 is actuated. Brake fluid discharged from the pump 24 to the hydraulic pressure discharge channel N1 is regulated into predetermined pressure through the cut valve 21 of the regulator 20. As a result, braking control for the front and rear wheels F, R starts through the first hydraulic pressure output channel D1, the first wheel hydraulic pressure channel E1, and second wheel hydraulic pressure channel E2.

In normal braking control where there is no scare of being locked, the cut valve 21 is closed and the inlet valves 22A, 22B are opened. Accordingly, brake fluid in the accumulators 7, 8 is sucked into the pump 24 through the first hydraulic pressure output channel D1 and the hydraulic pressure intake channel G1, and then discharged through the pump 24 to the hydraulic pressure discharge channel N1. While delivered to the wheel brake R through the inlet valve 22A on the first wheel hydraulic pressure channel E1, the brake fluid is delivered to the wheel brake F through the inlet valve 22B on second wheel hydraulic pressure channel E2. The delivery of the brake fluid to the wheel brakes R, F continues until the controller 40 determines that the measured value at the first hydraulic pressure sensor 11 corresponds to the measured value at the pressure-detecting sensor 10C. The controller 40 may control the interlock braking with the measured value at the second hydraulic pressure sensor 12 or only the rear wheel.

In the interlock braking, as described above, the brake fluid delivered from the first brake system K1 to the front wheel brake F is delivered to the cylinder FS3 of the three cylinders FS1 to FS3 in the brake cylinder FS. According to the embodiment, the cylinder FS3 is smaller in diameter than the other cylinders FS1 and FS2 (not shown), braking force by the cylinder FS3 is smaller than the cylinders FS1 and FS2. Therefore, braking force for the front wheel in the interlock braking is smaller than when braking force is applied only to the front wheel. The braking force applied to the front wheel can be appropriately changed in interlock braking by changing the diameter of the cylinder FS3.

Further, because the cylinders F1 to F3 in the brake cylinder FS independently operate, brake fluid does not flow between the cylinder FS3 for the first brake system K1 and the other cylinders FS1 and FS2 for the second brake system K2. Accordingly, pulsation is not transmitted between the cylinder FS3 for the first brake system K1 and the cylinders FS1 and FS2 for the second brake system K2. In interlock braking through the first brake system K1, when the brake lever L2 is operated, the front wheel is controlled through the second brake system K2 and it is possible to prevent pulsation by the pump 24 from being transmitted to the brake lever L2 through the channel. Therefore, good operational sensitivity for the brake lever L2 is achieved in interlock braking as well.

As the brake pedal L1 is released or the operation is stopped, brake fluid flowing to the first wheel hydraulic pressure channel E1 and the interlocking wheel hydraulic pressure channel E0 is released from the release channel Q1 to the hydraulic pressure intake channel G1 through the outlet valves 23A, 23B and returns to the accumulators 7, 8 through the first hydraulic pressure output channel D1.

Further, when the brake lever L2 of the second brake system K2 for the front wheel is operated and the wheel brake F is in operation, interlock braking is possible even though the controller 40 determines that it needs to apply braking force to the rear wheel as well. Under the determination, the first control valve unit A and the interlocking control valve unit B are appropriately controlled on the basis of the measured value by the third hydraulic pressure sensor 13 in the second brake system K2.

On the other hand, in the second brake system K2 for the front wheel, even though the driving unit, such as an engine, is stopped or in operation, the channel from the second master cylinder MC2 to the wheel brake F is communicated through the second hydraulic pressure output channel D2. Accordingly, when the brake lever L2 is operated, hydraulic brake pressure is transmitted to the cylinders FS1 and FS2 in the brake cylinder FS for the wheel brake F, through the second hydraulic pressure output channel D2, inlet valve 22C, and second wheel hydraulic pressure channel E2. Therefore, the front wheel brake can be controlled by operating the brake lever L2.

(Anti-Lock Braking Control)

Anti-lock braking control is performed when the wheels are locked, in which the first control valve unit A, the interlock control unit B, and the second control unit C corresponding to the wheel bakes R, F locked are each controlled and it is appropriately selected to decrease, increase, or maintain hydraulic brake pressure exerted in the wheel brakes R, F. Decreasing, increasing, or maintaining the hydraulic brake pressure is determined by the controller 40, on the basis of speed of the wheels obtained from the rear wheel speed sensor 42 and the front wheel speed sensor 41

When the controller 40 determines that it needs to decrease hydraulic brake pressure exerted in the rear wheel brake R, the release channel Q1 is opened and the first wheel hydraulic pressure channel E1 is closed by the first control valve unit A. In detail, the inlet valve 22A is closed by excitation by the controller 40 and the outlet valve 23A is opened by excitation by the controller 40. Under the above condition, the brake fluid in the first wheel hydraulic pressure channel E1 connected to the wheel brake R flows from the first hydraulic pressure output channel D1 to the accumulators 7, 8, through the release channel Q1. As a result, hydraulic brake pressure exerted in the rear wheel brake R decreases.

Further, when the controller 40 determines that it needs to maintain hydraulic brake pressure exerted in the rear wheel brake R, the first wheel hydraulic pressure channel E1 and the release channel Q1 are closed by the first control valve unit A. In detail, the inlet valve 22A is closed by excitation by the controller 40 and the outlet valve 23A is closed by demagnetization by the controller 40. Under the above condition, brake fluid is confined within the channels closed at the wheel brake R, inlet valve 22A, and outlet valve 23A. As a result, the hydraulic brake pressure exerted in the wheel brake R is maintained.

On the other hand, when the controller 40 determines that it needs to maintain hydraulic brake pressure exerted in the rear wheel brake R, the first wheel hydraulic pressure channel E1 is opened by the first control valve unit A and the release channel Q1 is closed. In detail, the inlet valve 22A is opened by demagnetization by the controller 40 and the outlet valve 23A is closed by demagnetization by the controller 40. Under the above condition, the brake fluid discharged out of the pump 24 through the hydraulic pressure discharge channel N1 to the first wheel hydraulic pressure channel E1 influences the wheel brake R through the inlet valve 22A and increases hydraulic brake pressure.

When the hydraulic brake pressure in the first wheel hydraulic pressure channel E1 (the interlocking wheel hydraulic pressure channel E0) is above a predetermined value, the brake fluid in the first wheel hydraulic pressure channel E1 (the interlocking wheel hydraulic pressure channel E0) is released to the hydraulic pressure intake channel G1 by the cut valve 21. As a result, excessive hydraulic brake pressure is not exerted in the wheel brake R.

The above interlock braking is always possible by operating the brake pedal L1, but not limited thereto. For example, the interlock braking may be performed when the controller 40 determines that it needs to apply braking force to the front wheel as well, from the quantity of state representing condition of a vehicle, on the basis of detected signals inputted from the pressure-detecting sensor 10C to the controller 40.

In the interlock braking, for example, a desired value is set for hydraulic brake pressure discharged from the interlocking control valve unit B on the basis of measured value by the first hydraulic pressure sensor 11, and while the second hydraulic pressure sensor 12 measures the value, the controller 40 controls the interlocking control valve unit B. According to this configuration, the inlet valve 22B in the interlocking control valve unit B is open until the measured value by the second hydraulic pressure sensor 12 reaches the desired value, and the brake fluid in the accumulators 7, 8 is flows to the hydraulic pressure discharge channel N1 through the pump 24. As a result, it is possible to automatically actuate the front wheel brake F in interlock braking.

According to the vehicular brake hydraulic pressure control device, since the channel of brake fluid flowing to the first hydraulic pressure output channel D1 is switched from the first master cylinder MC1 to the accumulators 7, 8 by the cutoff valve 6 with the pump 24 in operation, the brake fluid is blocked between the brake pedal L1 and the modulator M1 by the cutoff valve 6 dividing them. Accordingly, even though pulsation is generated by the pump 24 in the first brake system K1, it cannot be transmitted from the first hydraulic pressure output channel D1 to the brake pedal L1.

Further, the front wheel brake F of the second brake system K2 includes the brake cylinder FS consisting of the three cylinders FS1 to FS3, brake fluid out of the interlocking control valve unit B of the first brake system K1 flows into the cylinder FS3 connected to the first port, brake fluid out of the second control valve unit C flows into the cylinders FS1 and FS2 connected to the second port, and brake fluid cannot flow between the ports. Therefore, pulsation by the pump 24 in operation is not transmitted. Furthermore, for example, even though, other than hydraulic brake pressure exerted in the front brake F from interlock braking by the interlocking control valve unit B of the first brake system K1, hydraulic brake pressure is additionally applied to the front wheel brake F by the operation of the brake lever L2, pulsation due to the pump 24 in operation in the first brake system K1 is not transmitted to the brake lever L2. Further, operational sensitivity does not deteriorate even in the interlock braking.

Further, since accumulators 7, 8 store brake fluid to supply to the first hydraulic pressure output channel D1, at atmosphere, when the brake pedal L1 is divided from the modulator M1 by the cutoff valve 6 such that brake fluid cannot flows therebetween, brake fluid is smoothly supplied from the accumulators 7, 8 to the first hydraulic pressure output channel D1, if needed. Further, in anti-lock braking control, brake fluid having returned from the wheel brake R smoothly returns to the accumulators 7, 8. Therefore, it is not necessary to provide a reservoir or an intake valve in the first brake system K1, which reduces the number of parts and the size of the device with manufacturing cost saved.

Further, the first brake system K1 includes the stroke simulator Si, the operational amount of the brake pedal L1 is detected by the pressure-detecting sensor 10C, and the first control valve unit A and interlocking control valve unit B are controlled by the detected value. Therefore, operational reacting force corresponding to the operational amount of the brake pedal L1 is applied by the stroke accumulator Si. Further, even though the braked pedal L1 and the modulator M1 are divided such that brake fluid cannot flow therebetween, braking based on the operational amount of the brake pedal L1 can be applied to the modulator M1.

Further, since the cutoff valve 6 is provided in the first hydraulic pressure output channel D1 with low cost, it is possible to block pulsation transmitted to the brake pedal L1 with low manufacturing cost.

Further, since the accumulators 7, 8 are connected to the first hydraulic pressure output channel D1, brake fluid can flows between the accumulators 7, 8 and the first hydraulic pressure output channel D1, regardless of the cutout 6 open or closed. Further, brake fluid is appropriately stored in the accumulators 7, 8. As a result, steady hydraulic brake pressure control is achieved.

Further, brake fluid that has returned to the first hydraulic pressure output channel D1 through the hydraulic pressure intake channel G1 of the pump 24 flows into the accumulators 7, 8. Accordingly, even though brake fluid is returned often to the hydraulic pressure intake channel G1 of the pump 24 when pressure is decreased in anti-lock braking control, it can be sufficiently returned to the accumulators 7, 8 and decreased smooth in pressure. As a result, steady hydraulic brake pressure control is achieved.

In the above description, preferred embodiments of the invention were described, but the invention is not limited thereto and a variety of modification may be applied to the invention.

For example, the accumulators 7, 8 was included in the stroke simulator Si, but may be included in the first hydraulic pressure output channel D1 of the modulator M1.

Further, for example, the second brake system K2 may have the same configuration as the first brake system K1. Specifically, it may be possible that the stroke simulator Si is connected to the brake pedal L1 and the second brake system k2 controls braking from the brake pedal L1 on the basis of measured values by a detecting unit of the stroke simulator Si.

Further, the first brake system K1 was provided for the rear wheel brake system in the above embodiments, but may be for the front wheel brake system. On the contrary, the second brake system K2 was provided for the front wheel brake system, but may be for the rear wheel brake system.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicular brake hydraulic pressure control device comprising:
   first and second brake operation elements;
   a first brake system comprising:
      a first control valve unit that actuates a first wheel brake; and
      an interlocking control valve unit that actuates a second wheel brake;
      wherein the first control valve unit and the interlocking control valve unit are operated in response to operation of the first operation element;
   a second brake system comprising a second control valve unit that actuates a second wheel brake in response to an operation of the second operation element; and
   a switching unit;
   wherein the first brake system comprises:
      a first master cylinder that is connected to the first operation element and generates hydraulic brake pressure in a first hydraulic pressure output channel communicating with the first control valve unit and the interlocking control valve unit;
      one or more accumulators that stores brake fluid, which is supplied to the first hydraulic pressure output channel, at atmosphere;
      a cut valve that is disposed between the first hydraulic pressure output channel, and a first wheel hydraulic pressure channel connected to the first wheel brake and an interlocking wheel hydraulic pressure channel connected to the second wheel brake, and switches between allow-state and block-state, in which brake fluid is allowed to flow or is blocked, respectively, from the first hydraulic pressure output channel to the first wheel hydraulic pressure channel and the interlocking wheel hydraulic pressure channel; and
      a pump that is disposed between a hydraulic pressure intake channel connected to the first hydraulic pressure output channel and a hydraulic pressure discharge channel connected to the first wheel hydraulic pressure channel and the interlocking wheel hydraulic pressure channel, and
   the second brake system comprises:
      a second master cylinder that is connected to the second operation element and generates hydraulic brake pressure in a second hydraulic pressure output channel connected to the second control valve unit,
      a plurality of brake cylinders that is provided in the second wheel brake, and comprising:
         a first port into which brake fluid flows from the interlocking control valve unit of the first brake system, and
         second ports into which brake fluid flowed from the second control valve unit enter thereto through other corresponding channels than the interlocking control valve unit, and
      wherein the plurality of brake cylinders are actuated independently by corresponding brake fluid flowed from the interlocking control valve unit and the second control valve unit, and
   wherein the switching unit changes a channel through which the brake fluid flows into the first hydraulic pressure output channel, from the first master cylinder to the one or more accumulators, when the pump is in operation.

2. The device according to claim 1, further comprising:
   a detecting unit that detects the operational amount of the first operation element;
   a stroke simulator that is connected to the first hydraulic pressure output channel, and applies reacting force to the first operation element in accordance with the detected operational amount by the detecting unit when the pump is in operation; and
   wherein the first control valve unit and the interlocking control valve unit are controlled on the basis of detected operational amount by the detecting unit.

3. The device according to claim 1,
   wherein the switching unit is a cutoff valve that opens and closes the first hydraulic pressure output channel and
   the one or more accumulators is connected to the first hydraulic pressure output channel such that brake fluid flows into or out the one or more accumulators.

4. The device according to claim 1,
   wherein the brake fluid returned to the first hydraulic pressure output channel through the hydraulic pressure intake channel flows into the one or more accumulators.

5. The device according to claim 1,
   wherein the first brake system is a rear wheel brake system, and
   the second brake system is a front wheel brake system.

6. The device according to claim 1,
   wherein the first brake system is a front wheel brake system, and
   the second brake system is a rear wheel brake system.

* * * * *